United States Patent
Chen et al.

(10) Patent No.: US 11,566,109 B2
(45) Date of Patent: Jan. 31, 2023

(54) POLYSILOXANE-POLYESTER BLOCK COPOLYMER, METHOD FOR PRODUCING THE SAME, AND USE THEREOF

(71) Applicant: DOW SILICONES CORPORATION, Midland, MI (US)

(72) Inventors: Wenjie Chen, Shanghai (CN); Zhihua Liu, Shanghai (CN); Fang Zhang, Midland, MI (US); Jiayin Zhu, Shanghai (CN)

(73) Assignee: DOW SILICONES CORPORATION, Midland, MI (US)

( * ) Notice: Subject to any disclaimer, the term of this patent is extended or adjusted under 35 U.S.C. 154(b) by 392 days.

(21) Appl. No.: 16/638,981

(22) PCT Filed: Aug. 16, 2017

(86) PCT No.: PCT/CN2017/097651
§ 371 (c)(1),
(2) Date: Feb. 13, 2020

(87) PCT Pub. No.: WO2019/033295
PCT Pub. Date: Feb. 21, 2019

(65) Prior Publication Data
US 2020/0362116 A1    Nov. 19, 2020

(51) Int. Cl.
*C08G 77/445* (2006.01)
*C09D 183/10* (2006.01)

(52) U.S. Cl.
CPC ......... *C08G 77/445* (2013.01); *C09D 183/10* (2013.01)

(58) Field of Classification Search
CPC .................................................. C08G 77/445
See application file for complete search history.

(56) References Cited

U.S. PATENT DOCUMENTS

| | | |
|---|---|---|
| 3,701,815 A | 10/1972 | Matzner et al. |
| 2001/0039311 A1 | 11/2001 | Soyama et al. |
| 2002/0013412 A1 | 1/2002 | Saito et al. |
| 2003/0068506 A1 | 4/2003 | Reusmann |
| 2005/0136267 A1 | 6/2005 | Greene et al. |
| 2015/0045486 A1 | 2/2015 | Horstman et al. |
| 2015/0045520 A1 | 2/2015 | Horstman et al. |
| 2015/0079407 A1 | 3/2015 | Bekemeier et al. |
| 2015/0175843 A1 | 6/2015 | Sonada et al. |
| 2016/0009866 A1 | 1/2016 | Swier |
| 2017/0194539 A1 | 7/2017 | Henning et al. |

FOREIGN PATENT DOCUMENTS

| | | |
|---|---|---|
| JP | H0753723 A | 2/1995 |
| JP | H083300 A | 1/1996 |
| JP | H09328555 A | 12/1997 |
| JP | H09328556 A | 12/1997 |
| JP | 2000338720 A | 12/2000 |
| JP | 2001064584 A | 3/2001 |
| JP | 2001335638 A | 12/2001 |
| JP | 2001342264 A | 12/2001 |
| JP | 2007520593 A | 7/2007 |
| JP | 2015503008 A | 1/2015 |
| JP | 2015516999 A | 6/2015 |
| JP | 2016517463 A | 6/2016 |
| JP | 2017529254 A | 10/2017 |
| WO | 2013152732 A1 | 10/2013 |
| WO | 2015052229 A1 | 4/2015 |

OTHER PUBLICATIONS

International Search Report for PCT/CN2017/097651 dated Apr. 27, 2018, 4 pages.
Biljana Dojcinovic et al. "Synthesis of thermoplastic poly(ester-siloxane) in the melt and in solution", Journal of the Serbian Chemical Society, vol. 70, No. 12, Dec. 31, 2005, pp. 1471-1472.
Machine assisted English translation of JPH0753723A obtained from https://woridwide.espacenet.com/patent on Apr. 1, 2021, 9 pages.
Machine assisted English translation of JP2000338720A obtained from https://worldwide.espacenet.com/patent on Apr. 1, 2021, 24 pages.
Machine assisted English translation of JPH09328555A obtained from https://woridwide.espacenet.com/patent on Apr. 1, 2021, 14 pages.
Machine assisted English translation of JPH09328556A obtained from https://woridwide.espacenet.com/patent on Apr. 1, 2021, 15 pages.
Machine assisted English translation of JP2001335638A obtained from https://woridwide.espacenet.com/patent on Apr. 1, 2021, 33 pages.
Machine assisted English translation of JPH083300A obtained from https://woridwide.espacenet.com/patent on Apr. 1, 2021, 13 pages.

*Primary Examiner* — Marc S Zimmer
(74) *Attorney, Agent, or Firm* — Warner Norcross + Judd LLP

(57) ABSTRACT

A polysiloxane-polyester block copolymer is provided, which comprises: (i) a siloxane resin block comprising: a siloxane unit represented by the formula: $R^1SiO_{3/2}$, wherein $R_1$ is a monovalent hydrocarbon group, and comprising optionally a siloxane unit represented by the formula: $SiO_{4/2}$; (ii) a siloxane linear block represented by the formula: $(R^2{}_2SiO_{2/2})_n$, wherein each $R^2$ is independently a monovalent hydrocarbon group, and "n" is a positive number of at least 5; and (iii) a polyester block. The polysiloxane-polyester block copolymer can be used for a protective coating on a substrate which is made of aluminum, stainless steel, iron, plastics or glass to provide durable heat-resistance, hot hardness, release and anti-graffiti properties.

20 Claims, 2 Drawing Sheets

FIG. 1

| Level | Description | View |
|---|---|---|
| 1 | There is not any beading spot on the marked surface. | 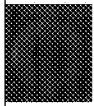 |
| 2 | There are beading spots in the part of the marked surface. | 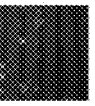 |
| 3 | There are beading spots whole of the marked surface, but spots are isolated. |  |
| 4 | Many beading spots combines and creates large clustered area on the marked surface, but some spots are still isolated. |  |
| 5 | Most of beading spots creates large cluster, the marker ink becomes rather isolated spots. | 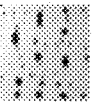 |

FIG. 2
| | | Practical Example 1 | Practical Example 2 | Comparative Example 1 | Comparative Example 2 | Comparative Example 3 |
|---|---|---|---|---|---|---|
| Appearance | | Clear | Clear | Clear | Clear | Clear |
| Bead Effects | View |  |  |  |  |  |
| | Level | 5 | 5 | 2 | 1 | 1 |
| Anti-graffiti | Rub off | 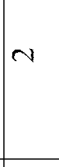 |  | 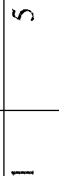 |  |  |
| | Time | ~50 | ~40 | 0 | 0 | 0 |
| Hardness | | 3H | 2H | 3H | 2H | 3H |
| Hot Hardness | 220°C | 2H | 2H | 3H | 2H | 3H |
| | 240°C | 2H | HB | 2H | H | 3H |
| | 260°C | H | HB | 2H | HB | 2H |
| | 280°C | H | B | H | B | 2H |
| Specific Adhesion | | Passed | Passed | Passed | Passed | Passed |

POLYSILOXANE-POLYESTER BLOCK COPOLYMER, METHOD FOR PRODUCING THE SAME, AND USE THEREOF

CROSS-REFERENCE TO RELATED APPLICATIONS

This application claims priority to and all advantages of, and is the National Stage of, International Appl. No. PCT/CN2017/097651 filed on 16 Aug. 2017, the content of which is hereby incorporated by reference.

TECHNICAL FIELD

This invention relates to a polysiloxane-polyester block copolymer, a method for producing the same, and use thereof. The terms "polysiloxane-polyester block copolymer" used herein are designed to mean reaction products of siloxane resin and linear block copolymer, and polyester, or compositions essentially consisting of the reaction products. The polysiloxane-polyester block copolymer is generally formed having three-dimensional units, typically formed via condensation reactions.

BACKGROUND ART

Polysiloxane-polyester copolymers are frequently used for cookware coatings or for electrical domestic appliance such as coatings for steam irons. The polysiloxane-polyester copolymers are able to form release or non-stick coatings to which extraneous materials will not adhere and residues for example food residues or spray starch can be removed easily as the cookware or appliance is cleaned. Cookware coatings include the external and interior surfaces of the utensils, such as sauté or frying pans, toasters, deep-fat fryers and baking trays.

These coatings require, along with thermal stability, resistance to scratches and marring, particularly when heated. Most organic coatings will exhibit some degree of thermoplasticity that, under normal kitchen conditions, can result in damaged coatings. The polyester part imparts low thermoplasticity, high flexibility and good pigmentability while the polysiloxane part brings heat resistance, weathering resistance and low surface tension.

For example, US Patent Application Publication No. 2005/0136267 A1 discloses a silicone-polyester copolymer prepared by reacting a silicone with a polyester, wherein the silicone comprises: 0 to 5 mole % of a siloxane unit represented by the formula: $SiO_{4/2}$ (hereafter referred to as "Q"), 30 to 100 mole % of a siloxane unit represented by the formula: $RSiO_{3/2}$ (hereafter referred to as "T"), 0 to 20 mole % of a siloxane unit represented by the formula: $R_2SiO_{2/2}$ (hereafter referred to as "D"), and 0 to 20 mole % of a siloxane unit represented by the formula: $R_3SiO_{1/2}$ (hereafter referred to as "M"), wherein each R is independently a monovalent hydrocarbon group with $C_{1-20}$ carbon atoms and each siloxane unit are random in the silicone; and US Patent Application Publication No. 2015/0079407 A1 discloses a silicone-polyester copolymer, wherein the silicone parts contains comprises: a siloxane unit represented by the formula: $C_6H_5SiO_{3/2}$ (hereafter referred to as "$T^{Ph}$"), a siloxane unit represented by the formula: $CH_3SiO_{3/2}$ (hereafter referred to as "$T^{Me}$") and Q unit and free of D unit.

These patents mention that these polysiloxane-polyester copolymers are able to form heat resistance and non-stick coating. However, these patents do not mention about the durability of heat resistance and non-stick, or anti-graffiti properties of coating.

This invention differs to these patents mentioned above is to incorporate siloxane resin-linear block in the copolymer with chemical bonding to provide the durable thermal resistance, hardness, also improve non-stick and anti-graffiti properties.

PRIOR ART DOCUMENTS

Patent Documents

Patent Document 1: US Patent Application Publication No. 2005/0136267 A1
Patent Document 2: US Patent Application Publication No. 2015/0079407 A1

SUMMARY OF INVENTION

Technical Problem

An object of the present invention is to provide a novel polysiloxane-polyester block copolymer comprising a siloxane resin block, a siloxane linear block, and a polyester block which can be used for a protective coating on a substrate to provide durable heat-resistance, hot hardness, release and anti-graffiti properties. Another object of the present invention is to provide a method for producing the polysiloxane-polyester block copolymer.

Solution to Problem

The polysiloxane-polyester block copolymer of the present invention comprises:
(i) a siloxane resin block comprising: a siloxane unit represented by the formula: $R^1SiO_{3/2}$, wherein $R^1$ is a monovalent hydrocarbon group; and comprising optionally a siloxane unit represented by the formula: $SiO_{4/2}$;
(ii) a siloxane linear block represented by the formula: $(R^2{}_2SiO_{2/2})_n$, wherein each $R^2$ is independently a monovalent hydrocarbon group, and "n" is a positive number of at least 5; and
(iii) a polyester block.

The siloxane resin block (i) preferably comprises 40 to 90 mole % of the siloxane unit represented by the formula: $R^1SiO_{3/2}$, and 10 to 60 mole % of the siloxane unit represented by the formula: $SiO_{4/2}$, based on the molar sum of these siloxane units.

The siloxane resin block (i) preferably comprises: $T^{Ph}$ unit, $T^{Me}$ unit, and Q unit.

The siloxane resin block (i) preferably comprises: 30 to 80 mole % of $T^{Ph}$ unit, 10 to 60 mole % of $T^{Me}$ unit, and 10 to 30 mole % of Q unit, based on the molar sum of these siloxane units.

The siloxane linear block (ii) is preferably represented by the formula: $((CH_3)_2SiO_{2/2})_n$, wherein "n" is a positive number of at least 5.

The content of the siloxane resin block (i) and the siloxane linear block (ii) is 10 to 70% by mass based on the sum of the blocks (i) through (iii).

The method for producing a polysiloxane-polyester block copolymer of the present invention, comprises the following steps:
(1) reacting a siloxane represented by the formula: $HO(R^2{}_2SiO)_nH$, wherein each $R^2$ is independently a monovalent hydrocarbon group, and "n" is a positive number of at least 5, with a silane compound represented by the formula: $R^3{}_a SiX_{(4-a)}$, wherein each $R^3$ is independently a monovalent hydrocarbon group, X is a hydrolysable group, and "a" is a number of 0 to 2, to produce a siloxane linear block precursor;

(2) co-hydrolysis and condensation of the said siloxane linear block precursor, a silane compound represented by the formula: $R^1 SiX_3$, wherein $R^1$ is a monovalent hydrocarbon group, and X is as defined above, and optional a silane compound represented by the formula: $SiX_4$, wherein X is as defined above, to produce a siloxane linear block-siloxane resin block precursor; and then (3) condensation of the said siloxane linear block-siloxane resin block precursor with polyester having a reaction group.

The silane compound represented by the formula: $R^1 SiX_3$, is preferably phenyltrialkoxysilane and methyltrialkoxysilane, and the siloxane unit represented by the formula: $SiX_4$ is preferably tetraalkoxysilane.

The polyester is preferably neopentylglycol or trimethylolpropane.

The use of the polysiloxane-polyester block copolymer of the present invention is characterized by forming a coating on a substrate.

The substrate is preferably made of aluminum, stainless steel, iron, plastics or glass.

Effects of Invention

The polysiloxane-polyester block copolymer of the present invention can cure to form a protective coating on a substrate which is made of aluminum, stainless steel, iron, plastics or glass to provide durable heat-resistance, hot hardness, release and anti-graffiti properties.

BRIEF DESCRIPTION OF THE DRAWINGS

FIG. 1 is a table showing visual inspection ratings of bead effects performance for examples; and FIG. 2 is a table showing results of practical and comparative examples.

DETAILED DESCRIPTION OF THE INVENTION

The polysiloxane-polyester block copolymer of the present invention comprises the siloxane resin block (i), the siloxane linear block (ii) and the polyester block (iii).

The siloxane resin block (i) comprises: a siloxane unit represented by the formula: $R^1 SiO_{3/2}$, and comprises optionally Q unit.

In the formula, $R^1$ is a monovalent hydrocarbon group such as an alkyl group with $C_{1-12}$ carbon atoms, alkenyl group with $C_{2-12}$ carbon atoms, aryl group with $C_{6-12}$ carbon atoms, and an aralkyl group with $C_{7-12}$ carbon atoms. Specific examples thereof include alkyl groups, such as a methyl group, ethyl group, propyl group, butyl group, pentyl group, hexyl group, heptyl group, octyl group, nonyl group, decyl group, undecyl group, and a dodecyl group; alkenyl groups, such as a vinyl group, allyl group, butenyl group, pentenyl group, hexenyl group, heptenyl group, octenyl group, nonenyl group, decenyl group, undecenyl group, and a dodecenyl group; aryl groups, such as a phenyl group, tolyl group, xylyl group, and a naphthyl group; aralkyl groups, such as a benzyl group, and a phenethyl group; and groups in which some or all of the hydrogen atoms bonded in these groups are substituted with halogen atoms, such as a chlorine atom and bromine atom. Of these, the methyl group and phenyl group are preferable. That is, the siloxane resin block (i) preferably comprises: $T^{Ph}$ unit, $T^{Me}$ unit, and Q unit.

In the siloxane resin block (i), the content of the siloxane unit represented by the formula: $R^1 SiO_{3/2}$ is not limited, but the siloxane resin block (i) preferably comprises: 40 to 90 mole % of the siloxane unit represented by the formula: $R^1 SiO_{3/2}$, and 10 to 60 mole % of Q unit, based on the molar sum of these siloxane units, more preferably 30 to 80 mole % of $T^{Ph}$ unit, 10 to 60 mole % of $T^{Me}$ unit, and 10 to 30 mole % of Q unit, based on the molar sum of these siloxane units. This is because the content of $T^{Ph}$ unit is greater than or equal to the lower limit of the aforementioned range, thermal resistance and gloss of the coating is good, when the content $T^{Me}$ unit is greater than or equal to the lower limit of the aforementioned range, the composition has good for film forming, and when the content Q unit is greater than or equal to the lower limit of the aforementioned range, the coating become hard.

The siloxane linear block (ii) is represented by the formula: $(R^2{}_2 SiO_{2/2})_n$.

In the formula, each $R^2$ is independently a monovalent hydrocarbon group such as said alkyl group with $C_{1-12}$ carbon atoms, alkenyl group with $C_{2-12}$ carbon atoms, aryl group with $C_{6-12}$ carbon atoms, and aralkyl group with $C_{7-12}$ carbon atoms. Of these, the alkyl group, especially, the methyl group is preferable. That is, the siloxane linear block (ii) is preferably represented by the formula: $((CH_3)_2 SiO_{2/2})_n$.

In the formula, "n" is a positive number of at least 5, preferably a positive number of 5 to 400, 5 to 300, 5 to 200, 10 to 400, 10 to 300, alternately, 10 to 200.

The polyester block (iii) is not limited, but suitable polyesters are formed in conventional manner from carboxylic acids (or their anhydrides) having acid functionalities of 2 or greater and polyols having hydroxyl functionalities of 2 or greater.

Examples of suitable multi-functional carboxylic acids include benzene-1,2,4-tricarboxylic acid, phthalic acid, tetrahydraphthalic acid, hexahydrophthalic acid, endobicyclo-2,2,1-5-heptyne-2,3-dicarboxylic acid, tetrachlorophthalic acid, cyclohexanedioic acid, succinic acid, isophthalic acid, terephthalic acid, azelaic acid, maleic acid, trimesic acid, 3,6-dichlorophthalic acid, tetrachlorophthalic acid, adipic acid, sebacic acid, and like carboxylic acids.

Examples of suitable multi-functional alcohols include glycerin, trimethylolpropane, trimethylolethane, trishydroxyethylisocyanurate, pentaerythritol, ethylene glycol, diethylene glycol, propylene glycol, trimethylene glycol, 1,3-, 1,2- and 1,4-butanediols, heptanediol, hexanediol, octanediol, 2,2'-bis(4-cyclohexanol)propane, neopentyl glycol, 2,2,3-trimethylpentane-1,3-diol, 1,4-dimethylolcyclohexane, 2,2,4-trimethylpentane diol, etc.

Whether the polyester is substantially carboxylic acid functional having COOH groups, or hydroxyl functional having OH groups, depends upon the COOH/OH molar ratio of the monomer mix. Most hydroxyl functional polyesters useful in the invention have hydroxy equivalent weights between 70 and 5,610. Most carboxylic acid functional polyesters useful in the invention have acid numbers of between 25 and 100 mg KOH/g. Most polyesters useful in the invention may be substantially straight chain having either hydroxyl or carboxylic acid functional of 2 or more or may be branched having hydroxyl or carboxylic acid functionality more than 2.5. In some cases, mixtures of polyesters having different functionalities may be used.

In certain embodiments, the polyester is prepared by reacting isophthalic acid with trimethylol propane. Alternatively, other acids, such as isophthalic acid, TPA, trimelitic anhydride, and tetrahydraphthalic acid, and other alcohols, such as TME, MPG, TMP, and NPG can be used.

The polysiloxane-polyester block copolymer is a new material synthesized by incorporating Q units along with $T^{Ph}$ unit into a silicone intermediate that was subsequently reacted with a hydroxyl functional polyester without gelation or prohibitive viscosity build. The polysiloxane-polyester block copolymer exhibits the needed boost in hot hardness. Therefore, the invention provides a silicone-polyester composition characterised in that the silicone part contains silicone resin block and silicone linear block.

The content of the siloxane resin block (i) and the siloxane linear block (ii) in the polysiloxane-polyester block copolymer is not limited, but it is preferably 10 to 70% by mass, or 30 to 60% by mass based on the sum of the blocks (i) through (iii). This is because when the content is greater than or equal to the lower limit of the aforementioned range, anti-graffiti performance is good, whereas when the content is less than or equal to the upper limit of the aforementioned range, the gelation risk due to reaction with polyester decreases.

While, the siloxane linear block (ii) in the polysiloxane-polyester block copolymer is not limited, but it is preferably 1 to 50% by mass, or 3 to 20% by mass based on the sum of the blocks (i) through (iii). This is because when the content is greater than or equal to the lower limit of the aforementioned range, release and anti-graffiti performance is good, whereas when the content is less than or equal to the upper limit of the aforementioned range, hardness and toughness of the coating is good.

The invention further provides a process of forming the polysiloxane-polyester block copolymer characterised in that a polyester precursor or polyester resin and a silicone precursor or silicone resin are reacted together, wherein the silicone part contains T and/or Q units and siloxane linear block. The method for producing a polysiloxane-polyester block copolymer of the present invention, comprises the following steps (1) though (3).

Step (1) is to react a siloxane represented by the formula: $HO(R^2_2SiO)_nH$ with a silane compound represented by the formula: $R^3_a SiX_{(4-a)}$ to produce a siloxane linear block precursor.

In the formula of the siloxane, each $R^2$ is independently a monovalent hydrocarbon group such as said alkyl group with $C_{1-12}$ carbon atoms, alkenyl group with $C_{2-12}$ carbon atoms, aryl group with $C_{6-12}$ carbon atoms, and aralkyl group with $C_{7-12}$ carbon atoms. Of these, the alkyl group, especially, the methyl group is preferable. That is, the siloxane is preferably represented by the formula: $HO((CH_3)_2SiO_{2/2})_nH$.

In the formula of the siloxane, "n" is a positive number of at least 5, preferably a positive number of 5 to 400, 5 to 300, 5 to 200, 10 to 400, 10 to 300, alternately, 10 to 200.

In the formula of the silane, each $R^3$ is independently a monovalent hydrocarbon group such as said alkyl group with $C_{1-12}$ carbon atoms, alkenyl group with $C_{2-12}$ carbon atoms, aryl group with $C_{6-12}$ carbon atoms, and aralkyl group with $C_{7-12}$ carbon atoms. Of these, the alkyl group, especially, the methyl group is preferable.

In the formula of the silane, X is a hydrolysable group such as an oximo group, acetoxy group, halogen atom, and an alkoxy group.

In the formula of the silane, "a" is a number of 0 to 2, preferably 0 or 1.

Examples of the silane include methyl tris(methylethylketoxime)silane (MTO), methyl triacetoxysilane, ethyl triacetoxysilane, tetraacetoxysilane, tetraoximesilane, dimethyl diacetoxysilane, dimethyl dioximesilane, and tris(methylmethylketoxime)silane.

In step (1), typically a silanol ended polydiorganosiloxane is reacted with an "endblocking" compound such as an alkyltriacetoxysilane or a dialkylketoxime. The stoichiometry of the endblocking reaction is typically adjusted such that a sufficient amount of the endblocking compound is added to react with all the silanol groups on the polydiorganosiloxane. Typically, a mole of the endblocking compound is used per mole of silanol on the polydiorganosiloxane. Alternatively, a slight molar excess such as 1 to 10% of the endblocking compound may be used. The reaction is typically conducted under anhydrous conditions to minimize condensation reactions of the silanol polydiorganosiloxane. Typically, the silanol ended polydiorganosiloxane and the endblocking compound are dissolved in an organic solvent under anhydrous conditions, and allowed to react at room temperature, or at elevated temperatures (up to the boiling point of the solvent).

Step (2) is to co-hydrolyze and condense the said siloxane linear block precursor, a silane compound represented by the formula: $R^1 SiX_3$, and optional a silane compound represented by the formula: $SiX_4$, to produce a siloxane linear block-siloxane resin block precursor.

In the formula of the former silane, $R^1$ is a monovalent hydrocarbon group such as said alkyl group with $C_{1-12}$ carbon atoms, alkenyl group with $C_{2-12}$ carbon atoms, aryl group with $C_{6-12}$ carbon atoms, and aralkyl group with $C_{7-12}$ carbon atoms. Of these, the methyl group and phenyl group are preferable.

In the formula of the former silane, X is a hydrolysable group such as an oximo group, acetoxy group, halogen atom, and an alkoxy group.

Examples of the former silane include phenyl trimethoxysilane, phenyl triethoxysilane, methyl trimethoxysilane, and methyl triethoxysilane.

In the formula of the latter silane, X is a hydrolysable group such as an oximo group, acetoxy group, halogen atom, and an alkoxy group.

Examples of the latter silane include tetraethylorthosilicate, and tetramethylorthosilicate.

In step (2), acid may be added to co-hydrolyze and condense the said siloxane linear block. Examples of the acid include HCl.

The siloxane linear block-siloxane resin block precursor comprises the siloxane resin block and the siloxane linear block, wherein the siloxane linear block is represented by the formula: $(R^2_2SiO_{2/2})_n$, wherein $R^2$ and "n" are as defined above.

Step (3) is to condense the said siloxane linear block-siloxane resin block precursor with polyester having a reaction group. The polyester is not limited, but suitable polyesters are formed in conventional manner from carboxylic acids (or their anhydrides) having acid functionalities of 2 or greater and polyols having hydroxyl functionalities of 2 or greater. The polyester is preferably neopentylglycol or trimethylolpropane.

In step (3), silicone precursor and polyester precursor are first reacted separately to form silicone resin and polyester resin respectively and these resins are subsequently reacted together.

The reaction temperature at which the polyester precursor or resin and the silicone precursor or resin are mixed together is preferably in the range of 80 to 150° C., optionally it may be around 100 to 125° C., more preferably 110 to 120° C.

Preferably, the polyester precursor is formed of isophtalic acid, neopentylglycol and trimethylolpropane or trimethylolethane.

The polysiloxane-polyester block copolymer can contain condensation catalysts including metal ligand complexes or organic bases. The condensation catalysts are added to enhance the cure of the copolymer. Examples of the condensation catalysts include organotitanium compounds such as tetraisopropyl titanate, tetrabutyl titanate, tetraoctyl titanate, titanium acetic acid salts, titanium diisopropoxybis (acetylacetonate), and titanium diisopropoxybis(ethyl acetoacetate); organozirconium compounds such as zirconium tetraacetylacetonate, zirconium hexafluoroacetylacetonate, zirconium trifluoroacetylacetonate, tetrakis(ethyltrifluoroacetylacetonate)zirconium, tetrakis(2,2,6,6-tetramethyl-heptanedionate), zirconium dibutoxybis (ethylacetoacetate), and zirconium diisopropoxybis(2,2,6,6-tetramethyl-heptanedionate); and organotin compounds such as dibutyltin dilaurate, dimethyltin dineodecanoate, dibutyltin diacetate, dimethylhydroxy(oleate)tin, and dioctyldilauryltin.

The content of condensation catalyst is not limited, but it is preferably in a range of 10 to 1,000 ppm, in a range of 10 to 500 ppm, or in a range of 10 to 300 ppm, in mass unit, in the polysiloxane-polyester block copolymer. This is because excellent curability is achieved and the coating has good thermal stability.

The polysiloxane-polyester block copolymer may contain other ingredients such as organic and/or inorganic pigment like titanium oxide or barium sulfate, hinder that adheres to the surface to be treated, a carrier either an organic solvent or water that carries the ingredients but evaporates when the coating is cured, or a reinforcing agent to provide wear protection. It can also contain filler like carbon black or silica, glimmer, matting agent, and release additives.

The invention extends to a coating on a substrate characterised in that the coating comprises a silicone-polyester composition as defined above. The coating may be fairly thin for example 20 to 25 μm and more generally from 5 to 500 μm, preferably from 15 to 100 μm. The coating may be applied in several ways to the substrate for example by spraying, curtain coating or roller coating the composition containing all ingredients.

The coating may be applied in several successive layers which may have different compositions. However preferably it is applied as a single coating layer which simplifies the process.

The invention extends to the use of the polysiloxane-polyester block copolymer as defined above to form a coating on a substrate.

The substrate is preferably made of aluminium, stainless steel, iron, plastics or glass.

The invention extends to a substrate bearing a coating characterised in that the coating comprises the polysiloxane-polyester block copolymer as defined above.

EXAMPLES

The polysiloxane-polyester block copolymer, the method for producing the same, and the use thereof of the present invention will now be described using Practical and Comparative Examples.

Reference Example 1

A 100 ml-three necked, round bottom flask fitted with a polytetrafluoroethylene (PTFE) stirrer and $N_2$ gas purge, was loaded with a mixture of 26.359 g of a silanol-terminated dimethylpolysiloxane (PDMS) represented by the following formula:

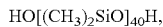

and 40 g of isopropyl alcohol (IPA). A pressure-equalizing addition funnel was loaded with 5 g of methyltriacetoxysilane. The nitrogen sweep was turned on, and the methyltriacetoxysilane was added dropwise in 5 minutes with stirring. Then the mixture was hold at room temperature for 3 hours to form methyldiacetoxysilyl-terminated PDMS in IPA solvent.

Reference Example 2

A 500 ml-three necked, round bottom flask fitted with a water cooled condenser, a PTFE stirrer and a thermocouple, was loaded with 144.0 g (0.60 moles) of phenyltriethoxysilane, 53.4 g (0.30 moles) of methyltriethoxysilane and 20.8 g (0.10 moles) of tetraethylorthosilicate. Then 70.368 g of the methyldiacetoxysilyl-terminated PDMS solution (0.33 moles of D unit) prepared by Reference Example 1 with 0.15 ml of concentrated HCl was added, and the mixture was heated slowly to 50° C. A pressure-equalizing addition funnel was charged with 23 g of deionized water. The nitrogen sweep was turned on. Water was added dropwise in about 20 minutes with stirring, and the mixture was heated to reflux for 6 hours. System was cooled down to 75° C., 0.8 g of $CaCO_3$ was added and hold for 1 hour. Mixture then heated to 100° C. and stepwise to remove volatiles and hold for 2 hours as well as vacuum puling for additional 1 hour. Finally, it was cooled down below 80° C., filtered and drummed off. The resulting silicone resin-linear block copolymer was prepared with clear liquid appearance and having viscosity of about 1,488 mPa·s at 25° C.

Reference Example 3

A 500 ml-three necked, round bottom flask fitted with a water cooled condenser, a PTFE stirrer and a thermocouple, was loaded with 160.8 g (0.67 moles) of phenyltriethoxysilane. Then 70.368 g of the methyldiacetoxysilyl-terminated PDMS solution (0.33 mol of D unit) prepared by Reference Example 1 with 0.12 ml of concentrated HCl was added, and the mixture was heated slowly to 50° C. A pressure-equalizing addition funnel was charged with 15 g of deionized water. The nitrogen sweep was turned on. Water was added dropwise in about 20 minutes with stirring, and the mixture was heated to reflux for 10 hours. System was cooled down to 75° C., 0.8 g of $CaCO_3$ was added and hold for 1 hour. Mixture then heated to 100° C. and stepwise to remove volatiles and hold for 2 hours as well as vacuum puling for additional 1 hour. Finally, it was cooled down below 80° C., filtered and drummed off. The resulting silicone resin-linear block copolymer was prepared with clear liquid appearance and having viscosity of about 3,654 mPa·s at 25° C.

Reference Example 4

A 500 ml-three necked, round bottom flask fitted with a water cooled condenser, a PTFE stirrer and a thermocouple, was loaded with 144.0 g (0.60 moles) of phenyltriethoxysilane, 53.4 g (0.30 moles) of methyltriethoxysilane and 20.8 g (0.10 moles) of tetraethylorthosilicate. Then 50 g (0.33 moles) of dimethyldiethoxylsilane with 0.15 ml of concentrated HCl was added, and the mixture was heated slowly to 50° C. A pressure-equalizing addition funnel was loaded with 29 g of deionized water. The nitrogen sweep was turned on. Water was added dropwise in about 20 minutes with stirring, and the mixture was heated to reflux for 2 hours. System was cooled down to 75° C., 0.8 g of $CaCO_3$ was added and hold for 1 hour. Mixture then heated to 100° C. and stepwise to remove volatiles and hold for 2 hours as well as vacuum puling for additional 1 hour. Finally, it was cooled down below 80° C., filtered and drummed off. The resulting polymer was clear liquid having viscosity of about 678 mPa·s at 25° C., with the random D unit distribution by using dimethyldiethoxysilane as D unit source.

Reference Example 5

A three-necked, round bottom flask fitted with a water cooled condenser, a PTFE stirrer, a thermocouple and $N_2$ gas purge was loaded with 107.34 g of trimethylolpropane (TMP), 29.23 g of adipic acid (AA) and 66.45 g of m-phthalic acid (PA). The nitrogen sweep, condenser and heating mantle were turned on. The materials were heated to 150° C. prior to turn on the stirrer motor. Then the whole was heated to 180° C., and hold until bulk of reaction water was removed. Periodically drain was trapped, and heated to 220° C., until water evolution stops. The temperature was kept and some samples were taken from the mixture for testing acid value. When the acid value was less than 10 mg KOH/g, heating was turned off and cooled to 140° C., added 109.32 g of propylene glycol monomethyl ether acetate (PMA) as solvent for diluting.

Practical Example 1

A 250 ml-three necked round bottom flask fitted with a water cooled condenser, a PTFE stirrer and a thermocouple, was loaded with 40 g of polyester precursor prepared by Reference Example 5. Then 30 g of siloxane resin-liner block copolymer prepared by Reference Example 2 was added, 40 g of propylene glycol monomethyl ether acetate (PMA) as solvent and 0.01 g of tetra-n-butyl titanate as catalyst were added into flask under nitrogen surrounding. The mixture was heated slowly up to 120° C. with stirring, trap off produced ethanol. After 5 hours, a transparent polysiloxane-polyester copolymer was prepared. Samples were picked up and dropped on glass panel regularly to check the appearance at room temperature until clear. Heating was stopped, cooled down below 60° C. Viscosity of prepared sample was about 500 mPa s at 25° C.

Practical Example 2

A 250 ml-three necked round bottom flask fitted with a water cooled condenser, a PTFE stirrer and a thermocouple, was loaded with 40 g of polyester precursor prepared by Reference Example 5. Then 30 g of siloxane resin-liner block copolymer prepared by Reference Example 3 was added, 40 g of propylene glycol monomethyl ether acetate (PMA) as solvent and 0.01 g of tetra-n-butyl titanate as catalyst were added into flask under nitrogen surrounding. The mixture was heated slowly up to 120° C. with stirring, trap off produced ethanol. After 5 hours, a transparent polysiloxane-polyester copolymer was prepared. Samples were picked up and dropped on glass panel regularly to check the appearance at room temperature until clear. Heating was stopped, cooled down below 60° C. Viscosity of prepared sample was about 1139 mPa·s at 25° C.

Comparative Example 1

A 250 ml-three necked round bottom flask fitted with a water cooled condenser, a PTFE stirrer and a thermocouple, was loaded with 40 g of polyester precursor prepared by Reference Example 5. Then 30 g of siloxane polymer prepared by Reference Example 4 was added, 40 g of propylene glycol monomethyl ether acetate (PMA) as solvent and 0.01 g of tetra-n-butyl titanate as catalyst were added into flask under nitrogen surrounding. The mixture was heated slowly up to 140° C. with stirring, trap off produced ethanol. After 8 hours, a transparent polysiloxane-polyester copolymer was prepared. Samples were picked up and dropped on glass panel regularly to check the appearance at room temperature until clear. Heating was stopped, cooled down below 60° C. Viscosity of prepared sample was about 1,438 mPa·s at 25° C.

Comparative Example 2

A 250 ml-three necked round bottom flask fitted with a water cooled condenser, a PTFE stirrer and a thermocouple, was loaded with 40 g of polyester precursor prepared by Reference Example 5. Then 30 g of siloxane polymer represented by the unit mole ratio of $D_{0.33}T^{Ph}_{0.67}$, with random D unit distribution, was added, 40 g of propylene glycol monomethyl ether acetate (PMA) as solvent and 0.01 g of tetra-n-butyl titanate as catalyst were added into flask under nitrogen surrounding. The mixture was heated slowly up to 140° C. with stirring, trap off produced ethanol. After 8 hours, a transparent polysiloxane-polyester copolymer was prepared. Samples were picked up and dropped on glass panel regularly to check the appearance at room temperature until clear. Heating was stopped, cooled down below 60° C. Viscosity of prepared sample was about 1,577 mPa·s at 25° C.

Comparative Example 3

A 250 ml-three necked round bottom flask fitted with a water cooled condenser, a PTFE stirrer and a thermocouple, was loaded with 40 g of polyester precursor prepared by Reference Example 5. Then 30 g of D unit free siloxane polymer represented by the unit formula: $T^{Me}_{0.30}T^{Ph}_{0.65}Q_{0.05}$, was added, 40 g of propylene glycol monomethyl ether acetate (PMA) as solvent and 0.01 g of tetra-n-butyl titanate as catalyst were added into flask under nitrogen surrounding. The mixture was heated slowly up to 140° C. with stirring, trap off produced ethanol. After 8 hours, a transparent polysiloxane-polyester copolymer was prepared. Samples were picked up and dropped on glass panel regularly to check the appearance at room temperature until clear. Heating was stopped, cooled down below 60° C. Viscosity of prepared sample was about 1,725 mPa·s at 25° C.

Appearance

The appearance of the silicone-polyester copolymer at 25° C. was observed by visual inspection.

Coating Performance

The final silicone-polyester copolymer was applied onto cleaned steel or aluminum panel for Hot Hardness and Adhesion. Thickness of the film was 20±5 μm. The coat was allowed to air drying for 15 minutes, and baked in oven at 280° C. for 10 minutes.

Beads Effects

This test is used to rate the oil repellency performance of the coating film. Draw a random line on the surface of coating by solvent based marker pen named ZEBRA BLACK. Check the beading effect of first draw. Rating the scale according to level index of beading test. The performance is rated by the visual inspection with following Table 1.

TABLE 1

| Level | Description | View |
|---|---|---|
| 1 | There is not any beading spot on the marked surface. | * |
| 2 | There are beading spots in the part of the marked surface. | * |
| 3 | There are beading spots whole of the marked surface, but spots are isolated. | * |
| 4 | Many beading spots combines and creates large clustered area on the marked surface, but some spots are still isolated. | * |
| 5 | Most of beading spots creates large cluster, the marker ink becomes rather isolated spots. | * |

* see FIG. 1.

Rub Off (Anti-Graffiti) Test Method

Draw a line by marker pen named ZEBRA BLACK and rub off by cotton cloth immediately. Repeat this action in the same position. Count the times up to the mark cannot be rub off completely. Make sure every time the cotton cloth is clean. Record the times until the mark can't be rub off completely.

Hot Hardness: Test Method (ASTM D3363)

Coated steel panels are placed on a cool hot plate. A surface thermometer is placed on the coated surface and the hot plate is turned on. As the panel temperature rises. The coatings are rated by attempting to scratch the surface with drafting pencils of increasing lead hardness. Coating hardness is rated as the highest pencil hardness that cannot scratch through the coating (higher numbers in front of the H indicate higher hardness).

Specific Adhesion:

Coated aluminum panels are boiled 2 hours in city water. Cutting the coating with 100 squares (each 1 mm×1 mm), a standard tape is used to attach on the 100 squares and peel quickly to check if there is any square drop off. No any drop off is defined as passed. Or else, it means failed.

TABLE 2

| | | Practical Example 1 | Practical Example 2 | Comparative Example 1 | Comparative Example 2 | Comparative Example 3 |
|---|---|---|---|---|---|---|
| Appearance | | Clear | Clear | Clear | Clear | Clear |
| Bead | View | ** | ** | ** | ** | ** |
| Effects | Level | 5 | 5 | 2 | 1 | 1 |
| Anti-graffiti | Rub off Time | ** ~50 | ** ~40 | ** 0 | ** 0 | ** 0 |
| Hardness | | 3H | 2H | 3H | 2H | 3H |
| Hot Hardness | 220° C. | 2H | 2H | 3H | 2H | 3H |
| | 240° C. | 2H | HB | 2H | H | 3H |
| | 260° C. | H | HB | 2H | HB | 2H |
| | 280° C. | H | B | H | B | 2H |
| Specific Adhesion | | Passed | Passed | Passed | Passed | Passed |

** see FIG. 2.

INDUSTRIAL APPLICABILITY

Since the polysiloxane-polyester block copolymer of the present invention forms a cured product on a substrate which is made of aluminum, stainless steel, iron, plastics or glass, the polysiloxane-polyester copolymer can be used in a protective coating to provide durable heat-resistance, hot hardness, release and anti-graffiti properties.

The invention claimed is:

1. A polysiloxane-polyester block copolymer comprising:
    (i) a siloxane resin block comprising: a siloxane unit represented by the formula: $R^1SiO_{3/2}$, wherein $R^1$ is a monovalent hydrocarbon group; and comprising optionally a siloxane unit represented by the formula: $SiO_{4/2}$;
    (ii) a siloxane linear block represented by the formula: $(R^2{}_2SiO_{2/2})_n$, wherein each $R^2$ is independently a monovalent hydrocarbon group, and "n" is a positive number of at least 5; and
    (iii) a polyester block;
    wherein a polysiloxane part in the polysiloxane-polyester block copolymer is a siloxane linear block-siloxane resin block consisting of the siloxane resin block (i) and the siloxane linear block (ii).

2. The polysiloxane-polyester block copolymer according to claim 1, wherein the siloxane resin block (i) comprises 40 to 90 mole % of the siloxane unit represented by the formula: $R^1SiO_{3/2}$, and 10 to 60 mole % of the siloxane unit represented by the formula: $SiO_{4/2}$, based on the molar sum of these siloxane units.

3. The polysiloxane-polyester block copolymer according to claim 1, wherein the siloxane resin block (i) comprises: a siloxane unit represented by the formula: $C_6H_5SiO_{3/2}$, a siloxane unit represented by the formula: $CH_3SiO_{3/2}$, and the siloxane unit represented by the formula: $SiO_{4/2}$.

4. The polysiloxane-polyester block copolymer according to claim 3, wherein the siloxane resin block (i) comprises: 30 to 80 mole % of the siloxane unit represented by the formula: $C_6H_5SiO_{3/2}$, 10 to 60 mole % of the siloxane unit represented by the formula: $CH_3SiO_{3/2}$, and 10 to 30 mole % of the siloxane unit represented by the formula: $SiO_{4/2}$, based on the molar sum of these siloxane units.

5. The polysiloxane-polyester block copolymer according to claim 1, wherein the siloxane linear block (ii) is represented by the formula: $((CH_3)_2SiO_{2/2})_n$, wherein "n" is a positive number of at least 5.

6. The polysiloxane-polyester block copolymer according to claim 1, wherein the content of the siloxane resin block (i) and the siloxane linear block (ii) is 10 to 70% by mass based on the sum of the blocks (i) through (iii).

7. A method for producing a polysiloxane-polyester block copolymer, the method comprising the following steps:
    (1) reacting a siloxane represented by the formula: $HO(R^2{}_2SiO)_nH$, wherein each $R^2$ is independently a monovalent hydrocarbon group, and "n" is a positive number of at least 5, with a silane compound represented by the formula: $R^3{}_aSiX^{(4-a)}$, wherein each $R^3$ is independently a monovalent hydrocarbon group, X is a hydrolysable group, and "a" is a number of 0 to 2, to produce a siloxane linear block precursor;
    (2) co-hydrolysis and condensation of the siloxane linear block precursor, a silane compound represented by the formula: $R^1SiX_3$, wherein $R^1$ is a monovalent hydrocarbon group, and X is as defined above, and optional a silane compound represented by the formula: $SiX_4$, wherein X is as defined above, to produce a siloxane linear block-siloxane resin block precursor; and then
    (3) condensation of the siloxane linear block-siloxane resin block precursor with a polyester having a reaction group.

8. The method according to claim 7, wherein the silane compound represented by the formula: $R^1SiX_3$, is phenyltrialkoxysilane and methyltrialkoxysilane, and the silane compound represented by the formula: $SiX_4$ is tetraalkoxysilane.

9. The method according to claim 7, wherein the polyester is formed from:
   i) a carboxylic acid, or an anhydride thereof, having an acid functionality of 2 or greater; and
   ii) a polyol selected from neopentylglycol or trimethylolpropane.

10. An article comprising a coating disposed on a substrate, wherein the coating comprises or is formed from the polysiloxane-polyester block copolymer according to claim 1.

11. The article according to claim 10, wherein the substrate is made of aluminum, stainless steel, iron, plastic or glass.

12. The polysiloxane-polyester block copolymer according to claim 1, wherein the siloxane resin block (i) comprises the siloxane unit represented by the formula $R^1SiO_{3/2}$ and the siloxane unit represented by the formula $SiO_{4/2}$.

13. The method according to claim 7, wherein the silane compound represented by the formula $SiX_4$ is present in step (2).

14. A polysiloxane-polyester block copolymer comprising:
   (i) a siloxane resin block comprising:
      a siloxane unit represented by the formula: $R^1SiO_{3/2}$, wherein $R^1$ is a monovalent hydrocarbon group; and
      a siloxane unit represented by the formula: $SiO_{4/2}$;
   (ii) a siloxane linear block represented by the formula: $(R^2{}_2SiO_{2/2})_n$, wherein each $R^2$ is independently a monovalent hydrocarbon group, and "n" is a positive number of at least 5; and
   (iii) a polyester block.

15. The polysiloxane-polyester block copolymer according to claim 14, wherein the siloxane resin block (i) comprises 40 to 90 mole % of the siloxane unit represented by the formula: $R^1SiO_{3/2}$, and 10 to 60 mole % of the siloxane unit represented by the formula: $SiO_{4/2}$, based on the molar sum of these siloxane units.

16. The polysiloxane-polyester block copolymer according to claim 14, wherein the siloxane resin block (i) comprises: a siloxane unit represented by the formula: $C_6H_5SiO_{3/2}$, a siloxane unit represented by the formula: $CH_3SiO_{3/2}$, and the siloxane unit represented by the formula: $SiO_{4/2}$.

17. The polysiloxane-polyester block copolymer according to claim 16, wherein the siloxane resin block (i) comprises: 30 to 80 mole % of the siloxane unit represented by the formula: $C_6H_5SiO_{3/2}$, 10 to 60 mole % of the siloxane unit represented by the formula: $CH_3SiO_{3/2}$, and 10 to 30 mole % of the siloxane unit represented by the formula: $SiO_{4/2}$, based on the molar sum of these siloxane units.

18. The polysiloxane-polyester block copolymer according to claim 14, wherein the siloxane linear block (ii) is represented by the formula: $((CH_3)_2SiO_{2/2})_n$, wherein "n" is a positive number of at least 5.

19. The polysiloxane-polyester block copolymer according to claim 14, wherein the content of the siloxane resin block (i) and the siloxane linear block (ii) is 10 to 70% by mass based on the sum of the blocks (i) through (iii).

20. An article comprising a coating disposed on a substrate, wherein the coating comprises or is formed from the polysiloxane-polyester block copolymer according to claim 14.

* * * * *